INVENTORS:
RALPH B. TILNEY,
JOHN A. SCHENK,
BY Kingsland, Rogers & Ezell
ATTORNEYS Nov. 26, 1963   R. B. TILNEY ETAL   3,111,816
THERMOSTATIC EXPANSION VALVE WITH COMPOUND
PRESSURE REGULATING OVERRIDE
Filed Nov. 7, 1958   2 Sheets-Sheet 2

INVENTORS:
RALPH B. TILNEY,
JOHN A. SCHENK
BY Kingsland, Rogers & Ezell
ATTORNEYS United States Patent Office 3,111,816
Patented Nov. 26, 1963

3,111,816
THERMOSTATIC EXPANSION VALVE WITH COMPOUND PRESSURE REGULATING OVERRIDE
Ralph B. Tilney, Clayton, and John A. Schenk, St. Louis, Mo., assignors to Alco Valve Company, St. Louis, Mo., a corporation of Missouri
Filed Nov. 7, 1958, Ser. No. 772,565
12 Claims. (Cl. 62—212)

The present invention relates generally to expansion valves for refrigerating systems. More particularly, it relates to a novel expansion valve which functions as a thermostatically controlled constant superheat valve under "normal" combinations of refrigerating load and condensing capacity, and as a compound pressure regulating valve under combinations of these parameters which lie outside the so-called "normal" range.

Briefly, the invention contemplates a unitary valve struction which can be employed in a generally conventional refrigerating system to maintain a substantially constant degree of superheat at the evaporator outlet under system pressures which remain below a predetermined relative condition, this operation, however, being subjected to pressure regulating override when the pressures tend to exceed the predetermined condition. A valve operating in the aforesaid manner will permit achievement of the high over-all operating efficiency which is characteristic of constant superheat control as long as the system is subjected to operation within the above-indicated so-called "normal" range. In addition, the valve will enable the system to continue in operation under conditions which ordinarily would subject the compressor to excessive power demanding overload. Thus, the various components of a refrigerating system, which includes a valve of the present invention, can be selected for best efficiency for a particular range of conditions which may be expected to prevail during the major periods of its operation, without the necessity for providing excess protective capacity for infrequently encountered overload conditions. This has particular significance in respect to the compressor and its prime mover, inasmuch as the input power requirement of the compressor tends to increase in correspondence with either an increase in refrigerating output or a decrease in condensing capacity. Hence, by automatic change-over from one mode of operation to another, the present valve limits the power requirement to a predetermined maximum despite unusual variations in operating conditions.

It is an object of the present invention, therefore, to provide a novel expansion valve which functions to limit the maximum power requirement in a refrigerating system.

It is another object of the present invention to provide a novel expansion valve having automatic change-over from one mode of operation to another in accordance with load demands.

It is another object of the invention to provide a novel thermostatically controlled expansion valve responsive to differential pressures for overriding the thermostatic demands.

It is another object of the invention to provide a dual range expansion valve incorporating pressure responsive biasing elements having different sized pressure areas for exerting primary influence under the different ranges of control.

It is another object of the invention to provide a novel expansion valve having a superheat regulating range and a pressure regulating range, and incorporating a biasing element which can be changed to influence the superheat setting without affecting the pressure regulating setting.

The foregoing, along with additional objects and advantages, will be apparent from the following description of preferred embodiments of the invention, as illustrated in the accompanying drawings, in which.

Figure 1:
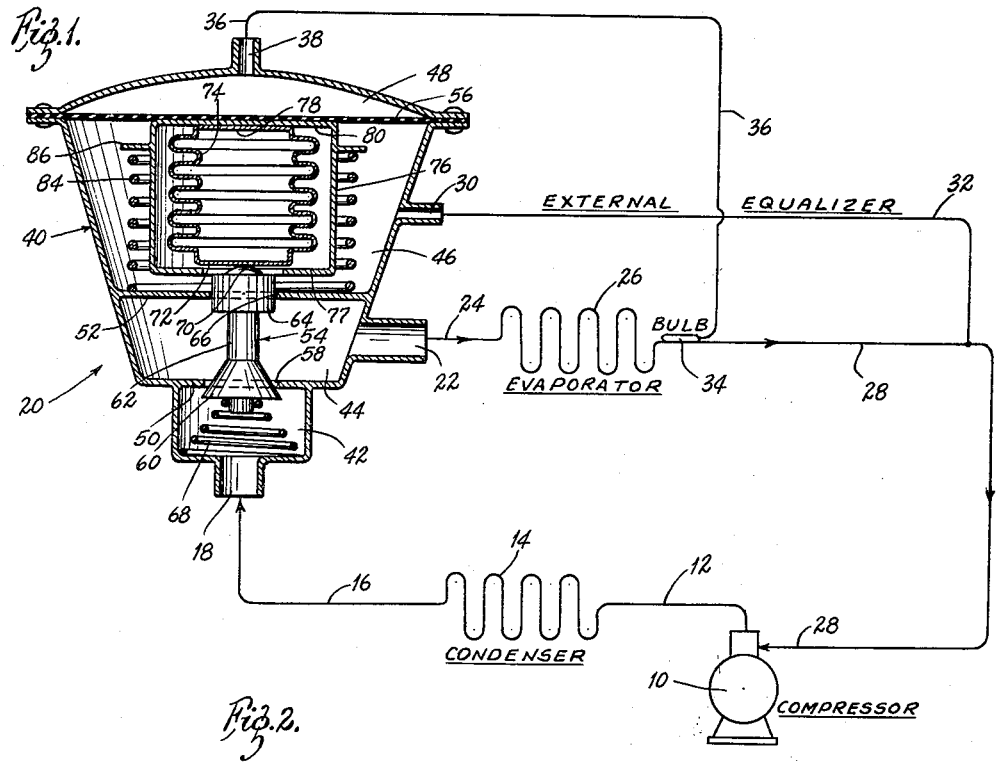
FIGURE 1 is a schematic view of a system conforming to the present invention, the expansion valve being shown in enlarged diagrammatic medial section.

Directing more particular attention to FIGURE 1, the illustrated refrigerating system includes a compressor 10 having a principal outlet pipe 12 connected into a condenser 14. The latter is then connected by means of a pipe 16, which may incorporate conventional receivers, into an inlet port 18 of the valve 20 of the present invention.

Continuing around the circuit, an outlet port 22 of the valve 20 is connected by a pipe 24 to an evaporator 26, and a return or suction pipe 28 communicates the evaporator back into the suction side of the compressor 10. In addition to the ports 18 and 22, the valve 20 has an equalizer port 30 which is connected by an external equalizer line 32 into the aforementioned pipe 28, and hence to the evaporator outlet. Finally, a temperature bulb 34 disposed at the evaporator outlet is connected by a capillary tube 36, or the like, into a port 38 of the valve 20. Clearly, the general arrangement of the refrigerating circuit as above described is wholly conventional insofar as the parts external to the valve 20 are concerned.

Directing particular attention now to the diagrammatically illustrated valve 20, a housing, shown generally as 40, is internally partitioned so as to define an inlet chamber 42, an outlet chamber 44, an equalizer chamber 46, and a thermostatic pressure chamber 48. As illustrated in FIGURE 1, the chambers are arranged in surmounting configuration. A partition 50 separates the inlet chamber 42 from the outlet chamber 44 and a partition 52 separates the latter chamber from the equalizer chamber 46. Both of these partitions 50 and 52 are relatively inflexible and each is provided with a central aperture for accommodation of a valve member 54. Separation between the chamber 46 and the thermostatic pressure chamber 48, on the other hand, is accomplished by an imperforate flexible diaphragm 56.

While each of the compartments or chambers of the valve 20 has respective external communication by means of an individual port, only the inlet chamber 42 and the outlet chamber 44 have normal inter-communication during the operation of the valve. This inter-communication is by way of an aperture 58 formed in the partition 50 and providing a seat for cooperation with a frusto-conical portion 60 of the valve member 54. The valve member also has an axial stem 62 provided with an enlarged cylindrical portion 64 extending slidably through an aperture 66 in the partition 52. It is to be understood that the valve portion 64 and the aperture 66 are so related as to provide a freely sliding fit, while at the same time providing a substantially leak-proof arrangement. Such an arrangement can, of course, be achieved through conventional use of packing, or by close fit and smooth finish of the parts.

A biasing spring 68 disposed in the inlet chamber 42 engages the large diameter end of the valve portion 60 to urge the member 54 in a direction to close the aperture 58 communicating the chamber 40 with the outlet chamber 44. A rounded terminal portion 70 at the opposite end of the valve member 54 is thereby urged into abutment with an end wall 72 of a bellows 74.

The bellows 74 is of generally conventional type and is charged with a gas, such as nitrogen for example, which is non-condensible under normally encountered temperatures and pressures. Thus charged, and hermetically sealed, the bellows is disposed in a cage 76 having an inturned flange portion 77 engageable with the bellows wall 72 so as to limit the extension of the bellows to a predetermined maximum dimension. An upper wall 78 of the bellows 74 is disposed flush against a wall 80 of the cage 76, and the latter wall is in turn disposed flush against the diaphragm 56 aforementioned. The wall 80 may be secured to either or both of the bellows wall 78 and the diaphragm 56, if desired, but it will be understood that predetermined pressure within the chamber 46 will be effective to collapse the bellows 74 in a manner to displace the lower wall 72 from the cage flange 77, and thus to foreshorten the distance between the diaphragm 76 and the bellows wall 72.

A superheat spring 84 has one end disposed against the fixed partition 52 of the housing 40 and its other end against an external flange 86 on the cage 76. This spring, under predetermined compression, urges the cage 76 with substantially constant predetermined force against the diaphragm 56.

It will be understood, of course, that the refrigerating system illustrated in FIGURE 1 is charged with an appropriate refrigerant fluid, such as Freon 22, for example, and it will be further understood that the bulb 34, along with the tube 36 and chamber 48 connected thereto, are charged with fluid having the same, or similar pressure-temperature properties, as is well-known in the refrigerating art. The quantity of fluid in the closed system comprising the bulb 34, tube 36, and chamber 48 is sufficient to preclude the conversion of all of the liquid in the bulb to gas.

Figure 2:
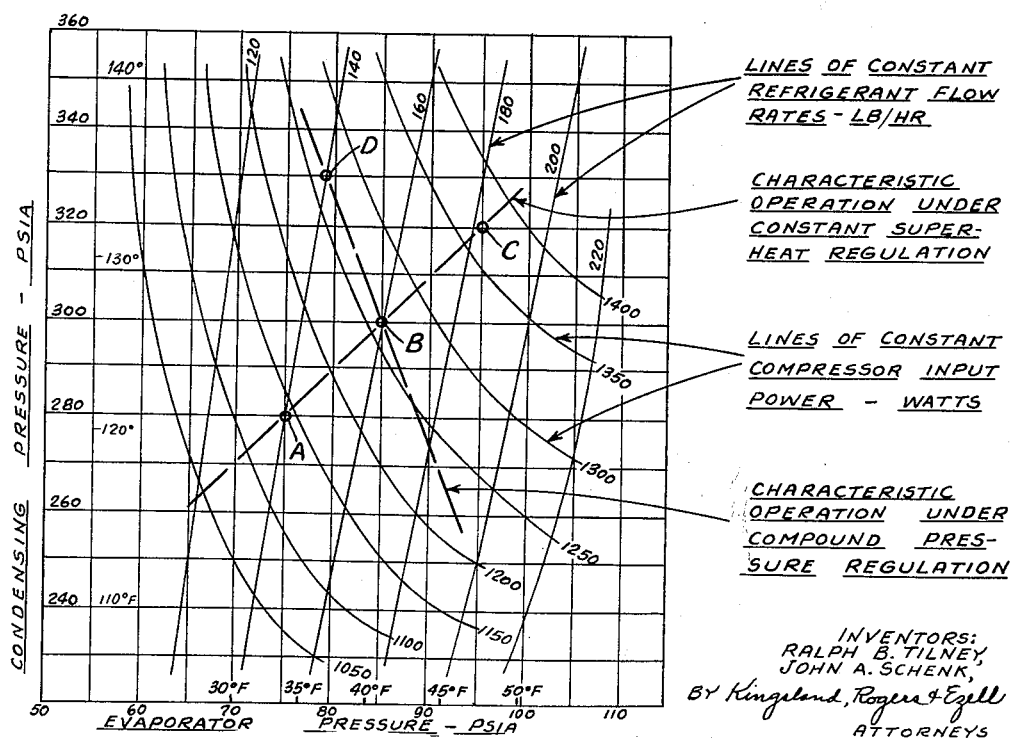
FIGURE 2 is a graph illustrating the general scheme of operation of the system.

Tse graph of FIGURE 2 depicts significant characteristics of a typical refrigerating system of the type shown in FIGURE 1 when operated with a fixed displacement compressor. The principal coordinates of this graph are the pressures which are developed on opposite sides of the valve 20, namely condensing pressure at the valve inlet and evaporator pressure, preferably taken at the outlet end of the evaporator. Along with the evaporator pressures, shown as abscissae, are shown temperatures of the saturated gas at the indicated pressures. Plotted on the graph are lines of constant weight rate of refrigerant flow covering a range from 120 to 220 pounds per hour, and lines of constant input power to the compressor covering a range from 1050 to 1400 watts per hour.

The curves of FIGURE 2 show that, in general, either an increase in refrigerating load, reflected as an increase in evaporator pressure, or a decrease in condensing capacity, reflected as an increase in condensing pressure, tends to increase the input power requirement of the system. Thus, with simultaneous increase in the aforesaid pressures, the power requirement for the compressor would rise quite rapidly. As a matter of fact, the general slope of the lines of constant power indicates that, in order for the power to remain constant, one of the pressures must be decreased while the other is increased. For operation of the system below a predetermined power input, however, it is evident that relatively wide variations of condenser and evaporator pressures may be accommodated by direct control of the flow rate of the refrigerant, and it is therefore feasible to regulate the flow rate for maximum system efficiency.

The refrigerating system depicted in FIGURE 1 operates in a generally conventional manner in that the compressor 10, which is assumed to be a constant displacement device, delivers refrigerant, such as Freon 22, as a compressed gas through the line 12 into the condenser 14 where it is condensed. The refrigerant liquid is then conducted by the liquid line 16 to the inlet port 18 of the expansion valve 20. Assuming the conical valve element 60 to be displaced from its seat 58, the refrigerant will flow into the chamber 44, thence on out of the outlet port 22 and through the line 24 to the evaporator 26. Expansion takes place in the usual manner in the valve 20, and the resulting mixture of liquid and gas enters the evaporator wherein the liquid is boiled into vapor. The latter then flows through the suction line 28 back into the compressor.

From the foregoing, it is evident that the amount of refrigerant which flows through the described cycle in a given period of time is largely a function of the position of the valve member 54, but it is also clear that the rate of flow through the aperture 58 will be affected by the variable pressures which exist on opposite sides thereof. In a system of the type under discussion, variations in condensing pressure of the liquid refrigerant entering the valve 20 are brought about primarily, of course, as a result of changes in the rate of heat absorption in the condenser 14, as by increase or decrease in temperature of the condensing medium for example. Variations in evaporator pressure, on the other hand, are primarily effected by changes in the rate of heat exchange in the evaporator 26.

As is clear from the accompanying drawing, the condensing pressure existing within the inlet chamber 42 acts against the enlarged end of the valve member 54 disposed within that chamber. The evaporator pressure, represented by the gas pressure which exists in the suction line 28, is communicated by the line 32 into the port 30 and thence into the equalizer chamber 46 of the valve 20 where it acts against that end of the valve member 54 which extends into the chamber 46. In addition, the pressure within this chamber operates to compress the bellows 74 against the non-condensable gas charge therewithin, and finally to provide an upward force against the movable diaphragm 56.

One more pressure exists within the valve 20 in addition to those thus far described, and that is the pressure of the refrigerant fluid contained in the bulb 34, the capillary line 36, and the low pressure chamber 48. The location of the bulb 34 at the evaporator outlet is, of course, conventional, and the previously mentioned fact that at least some of the fluid in this closed system remains in the liquid state assures that the pressure in the chamber 48 will at all times reflect the temperature of the refrigerant gas in the suction line 28.

As is well-known, the actual refrigerating effect takes place at the evaporator in a system of the type described herein. Assuming that all of the liquid refrigerant that enters the evaporator is vaporized therein, it is apparent that the greater the amount of refrigerant passing through the evaporator, the greater will be the refrigerating effect, and hence the greater refrigerating load to be accommodated. In other words, the weight rate of flow through the system is a measure of the magnitude of refrigerating performance. Assuming a compressor having substantially constant speed and positive displacement, it is evident that the expansion valve is the device which regulates the amount of flow through the system.

If it be assumed that the refrigerating system of FIGURE 1 is operating under stable conditions and well within its designed refrigeration capacity, the valve member 54 will be in such position as to admit refrigerant flow at a constant rate to the evaporator. For good efficiency the final portion of the refrigerant remaining in the liquid state will be vaporized as it approaches the evaporator outlet and the gas will then pass on to the compressor. Heat for vaporizing the refrigerant in the evaporator is of course taken from the ambient fluid which is understood to provide the refrigerating load.

Referring to the graph of FIGURE 2, the point A may be taken to represent a stabilized condition as described above wherein the weight rate of refrigerant flow is constant at 140 pounds per hour. The particular compressor on which the curves of FIGURE 2 are based will handle this rate of flow while developing a suction or evaporator pressure of about 75 pounds per square inch absolute and operating against an outlet pressure which is ultimately reflected as liquid or condensing pressure of approximately 280 pounds per square inch absolute. It does this while consuming power at a rate of approximately 1140 watts. The temperature scale on the chart indicates that the temperature of the gas in the evaporator is in the neighborhood of 34° F., this temperature being that of saturated vapor at the indicated pressure. The temperature of the gas at the evaporator outlet will be slightly in excess of the saturated vapor temperature, however, due to the fact that, upon complete vaporization of the liquid in the evaporator, the resulting gas will begin to be superheated. This is a normal and desirable condition to assure that no liquid is conveyed to the compressor.

If, now, the stabilized condition previously envisioned should change, as by being subjected to an increased refrigerating load, the valve member 54 in the valve 20 must be repositioned so as to permit an increased weight rate of refrigerant flow. If, then, it be assumed that the valve opens to a point such that the weight rate of flow is increased to 160 pounds per hour, the system may be considered to operate under the conditions indicated by the point B in the chart of FIGURE 2. Thus, the aforementioned increase in load has brought about changes in addition to an increase in weight rate of flow. The evaporator pressure has risen to approximately 85 p.s.i.. The condensing pressure has risen correspondingly to approximately 300 p.s.i. due to increased loading of the condenser. Since the compressor has constant speed and positive displacement, the obvious increased density of the gas which it receives and delivers necessitates a greater power input, which has now risen to approximately 1260 watts per hour. Finally, although the increased refrigerating load is being fully accommodated, it will be observed from the temperature scale on the chart that the temperature of the saturated gas in the evaporator has risen to approximately 41° F.

If the refrigerating load should continue to increase, the conditions of point C in the chart might be approached with still further increase in the values of all of the variables here considered. A line drawn through the points A, B, and C may be considered then to represent a typical or characteristic variation of operating conditions for efficient performance of the refrigerating system under variable load conditions. The illustrated variation is typical of that which is obtained through regulation involving the maintenance of a constant degree of superheat at the evaporator outlet. Such regulation is, of course, well understood in the refrigerating art.

Observing the line defined by the points A, B, and C in the chart of FIGURE 2, it is evident that increase of refrigerant flow in an effort to accommodate higher and higher refrigerating loads is attended by two distinct disadvantageous conditions. First, there is the constant increase in input power requirement of the compressor, and, second, there is the ever mounting temperature of the gas in the evaporator. The first condition obviously will entail the provision of overload prime mover capacity for the compressor, which will quickly become uneconomical. The second condition will have a deleterious effect upon dehumidification.

Inasmuch as refrigerating loads are frequently of a nature that precludes convenient limitation, it is obviously desirable that a refrigerating system should continue in operation under overload conditions, delivering maximum refrigerating effect commensurate with predetermined arbitrary limits in respect to power input and temperature of the evaporator. Referring once more to the chart of FIGURE 2, if it be desired, for example, to restrict the power input to a maximum of 1270 watts per hour and to maintain a gas temperature below 41° in the evaporator, the point B will obviously represent a critical point on the line ABC beyond which operation must be averted. In other words, operation along the line ABC appreciably above the point B would require power in access of 1270 watts and would increase the gas temperature above 41°.

It is clear from the chart that, with no increase in condensing capacity, the flow rate of 160 pounds per hour obtained at point B could not even be maintained, let alone increased, at higher refrigerating loads, without increasing both the power input and the evaporator temperature. It is further evident that operation under load conditions exceeding those represented by the point B must, perforce, follow upwardly along the line BD in order to maintain a desirably low gas temperature, without at the same time increasing the power requirement. The maximum refrigerating effect which can be provided under the limitations set forth will be from operation along this line, inasmuch as such operation utilizes the maximum allowed power input and maintains a desirably low gas temperature.

Significantly, it will also be noted that operation along the line BD entails increase in condensing pressure accompanied by decrease in evaporator pressure. This relative variation of pressures forms the basis of compound pressure regulation disclosed in the pending patent application of Ralph B. Tilney and John A. Schenk, Serial No. 740,265, filed June 6, 1958, now Patent Number 3,037,362.

In line with the foregoing discussion, it is the particular function of the valve 20 to regulate the flow of refrigerant under a varying refrigerating load to provide an over-all operating characteristic which follows the line ABC only as far as point B, whereupon further increase in refrigerating load will cause the operation to follow the line BD. Thus, the valve 20 provides constant superheat regulation up to a predetermined point beyond which the operation is continued under compound pressure regulation. In effect, the constant superheat regulation is subject to power limiting override under overload refrigerating conditions.

It may be noted at this point that, although primary emphasis in the present discussion has been devoted to the effect of variations in refrigerating load applied to the evaporator, the operation of the illustrated refrigerating system is equally sensitive to variations in the rate of heat exchange in the condenser.

Directing attention once more to the structural arrangement of the valve 20 and considering the conditions under which it operates, it is evident that the power assembly comprising the bulb 34 and the chamber 48 will at all times provide downward pressure against the diaphragm 56 in correspondence with the temperature of the bulb 34. Thus, the portion of the valve 20 above the diaphragm 56, including the bulb 34, operates at all times in a manner which is conventional in constant superheat valves.

If it be assumed for this portion of the discussion that the gas pressure within the bellows 74 is sufficient to expand the latter to the full length of the cage 76, the distance between the diaphragm 56 and the valve element 60 will remain constant so that any movement of the diaphragm will, perforce, be reflected in movement of the valve member 54. The valve member is obviously maintained in abutment with the lower end wall 72 of the bellows by the biasing spring 68. Also, as will soon appear, the different fluid pressures existing in the chambers 42 and 46 provides a net force which biases the member 54 into contact with the bellows wall 72.

Considering the valve member 54 alone, the direct forces tending to move it in an upward or valve closing direction include that exerted by the relatively light biasing spring 68 and that exerted by pressure of the liquid in the chamber 42 against the effective area at the lower end of the valve. The directly applied forces tending to move the valve 54 in a downward or valve opening direction include the force exerted against it by the bellows wall 72 and the evaporator pressure existing within the chamber 46 and acting over the end area of the cylindrical portion 62. The pressure within the inlet chamber 42 is greater than that within the equalizer chamber 46, and both of these pressures act upon substantially equal effective areas at opposite ends of the member 54. The pressure within the outlet chamber 44 does not directly affect the position of the member 54, inasmuch as the configuration of the valve member is such as to provide a balanced condition in this chamber.

While all of the aforesaid forces influence the position of the valve 54, it may be considered, by and large, that the position of the member 54 is dictated by the position of the bellows wall 72. This is evident from the fact that the tip 70 of the member 54 is, under normal operating conditions, in continuous abutting engagement with the wall 72. The forces which tend to move the valve member 54 in a valve closing direction are transferred to the bellows wall 72 and tend to collapse the bellows 74. The pressure which exists within the chamber 46 acts with the same tendency upon the bellows 74. Opposing these collapsing tendencies, however, is the gas pressure within the bellows which, under certain conditions of operation, is effective to maintain the bellows fully extended within the cage 76. Under this latter condition, then, namely, as long as the bellows 74 remains fully extended, the position of the valve member 54 will be governed by the position of the movable diaphragm 56.

The forces which act upon the diaphragm 56 include that exerted by the pressure within the chamber 48 acting on top of the diaphragm and tending to move the valve member 54 downwardly, the force exerted by the pressure within the equalizer chamber 46 acting on the bottom of the diaphragm 56 and tending to move it upwardly, and the force of the spring 84 which acts through the cage 76 also to urge the diaphragm upwardly.

The foregoing arrangement, wherein the bellows 74 is fully extended and the movement of the valve is in correspondence with movement of the diaphragm, will be recognized as being adapted to provide regulation based upon maintaining a substantially constant degree of superheat of the refrigerant at the evaporator outlet. In other words, if saturated refrigerant vapor were to exist at the evaporator outlet, the pressure and temperature in the bulb 34 and in the main refrigerant line adjacent thereto would be the same and the pressures within the chambers 46 and 48 would be equal to each other. Equal pressures acting over equal areas on opposite sides of the diaphragm 56 would, of course, balance each other, and the spring 84 would then be fully effective to move the valve member 54 in a closing direction. The effect of this would be to decrease the flow of refrigerant to the valve 10, which would ultimately be reflected in the development of a superheat condition at the evaporator outlet. As is well known, the resulting rise in temperature of the bulb 34 would provide increased pressure above the diaphragm 56 so that, under equilibrium conditions, the pressure in the chamber 48 must exceed that in the chamber 46 by an amount sufficient to balance, not only the lower pressure in the chamber 46, but also the force of the spring 84.

It should be mentioned at this point that the force of the spring 68, while relatively slight in comparison to the force of the spring 84, adds to the effect of the latter. Thus the total spring force, which governs the degree of superheat, is the sum of the forces of the springs 68 and 84. Hence, the springs may, under constant superheat regulation, be regarded as a single spring.

An additional force, applied indirectly and tending to affect the position of the diaphragm 56, is the force developed by the different pressures in the inlet chamber 42 and the equalizer chamber 46 acting upon opposite ends of the member 54. This net force, too, acts to displace the diaphragm upwardly and hence to close the valve member 54. Inasmuch, however, as the area of application of the net difference in pressure acting on the valve 54 is quite small in comparison to the area of the diaphragm 56, the total effect of this added force is of minor significance in respect to the constant superheat regulating operation of the valve 20. In this connection, attention is directed to the fact that as illustrated in the graph of FIGURE 2, under constant superheat regulation, an increase in condensing pressure is normally attended by a corresponding increase in evaporator pressure. This variance of the individual pressures in the same direction, of course, minimizes the variation in net pressure difference across the valve.

The foregoing discussion of operation of the valve 20 under constant superheat regulating conditions is based upon the fact that the combined tendency of both the pressure within the equalizer chamber 46 and the net upward thrust of the valve member 54 is insufficient to collapse the bellows 74 in a manner to move the wall 72 upwardly away from the flange 77 of the cage 76. Assuming the described operation to be represented by the points along the line ABC in FIGURE 2, however, it is evident that with continuing increase in weight rate of refrigerant flow, necessary to accommodate increased refrigerating load, these combined forces will increase correspondingly, so as ultimately to attain a magnitude, represented by the point B, where the bellows 74 begins to collapse. If the refrigerating load continues to increase, the superheat at the evaporator outlet will rise and the diaphragm 56 will be depressed by increased pressure within the chamber 48. The resulting downward deflection of the diaphragm 56, however, will not prevail to open the valve further in view of the reduced length of the partially collapsed bellows 74. Preferably, the arrangement is such that further downward deflection of the diaphragm 56 will cause the lower end of the cage 76 to abut the partition 52 so as to establish a fixed position of the upper end of the bellows 74. It will be clear, then, that a critical point has been reached, calling for constant superheat regulation to be overridden by a mode of regulation which, while remaining responsive to evaporator pressure, is no longer responsive to changes in temperature at the evaporator outlet.

Under the conditions of operation now envisioned for the valve 20, the diaphragm 56 and the spring 84 are no longer effective to move the valve member 54. With the deactivation of the spring 84, the forces tending to move the member 54 toward a closed position include that exerted by the relatively weak spring 68 and that exerted by the liquid pressure in the chamber 42 acting against the lower end of the valve member 54. This latter force, however, is now of greatly increased significance, as will appear.

The evaporator pressure existing within the equalizer chamber 46, although now ineffective to move the diaphragm 56, does, as previously indicated, assist in compressing the bellows 74. It still acts also to bias the valve member 54 downwardly in a direction away from the bellows 74, but, as is clear from the illustration of FIGURE 1, this merely reduces the net effective area over which it now acts to the difference between the area of the bellows wall 72 and the area of the upper end of the cylindrical portion 64 of the valve member 54. The net effect of the evaporator pressure then is to aid the spring 68 and the pressure which exists in the chamber 42 in urging the valve 60 toward a closed position. The force which balances these upwardly directed forces is the pressure of the non-condensable gas which exists within the bellows 74. Inasmuch as the total movement of the valve member 54 is quite limited under the mode of operation now being considered, the bellows force varies but slightly, as does the force exerted by the biasing spring 68. It will also be noted that changes which do occur due to change in length of the members 68 and 74 tend to compensate each other.

Under the foregoing conditions, the position of the valve member 54 becomes primarily a function of the relative pressures existing within the inlet chamber 42 and the equalizer chamber 46. In order for the valve member 54 to remain in equilibrium, a particular relationship must exist as between the liquid or condensing pressure and the evaporator pressure. Moreover, since both of these pressures influence the valve in the same direction, it is evident that if one is to increase, the other must decrease. This is the condition for compound pressure regulation as described in the aforementioned application of Tilney and Schenk, and this is the characteristic of the line BD in the graph of FIGURE 2.

As previously mentioned, operation of the present refrigerating system under the conditions represented by the point B in the graph is accompanied by maximum operative opening of the valve 20 to accommodate a maximum flow rate under prescribed limitations of evaporator temperature and power input. If the approach to the point B is made upwardly along the line ABC, each of these variables has undergone continuous increase. To reiterate, the valve has opened wider and wider, the weight rate of refrigerant flow has increased, the evaporator temperature has increased, and the power input has increased. All of this has transpired under constant superheat regulation, wherein the bulb 34 and the diaphragm 56 have been instrumental in opening the valve 54 in accordance with the demand of an increasing refrigerating load. As previously indicated, the regulating action of the valve is similarly responsive to changes in condenser capacity. Either a continued increase in refrigeration load, or any reduction in condensing capacity will result in increased superheat at the evaporator outlet and increased pressure upon the diaphragm 56. Having now reached the point B, however, further advance of the diaphragm 56 and of the valve 54 is impossible due to abutment of the cage 76 with the partition 52. Despite the fact that the valve can open no farther, the evaporator pressure tends to rise in accordance with the increased superheat, and this, along with the accompanying increase in uppward thrust of the liquid pressure against the valve member 54 is reflected, as previously noted, by partial collapse of the bellows 74 and consequent partial closure of the valve. Thus begins the seemingly anomalous operation of the system upwardly along the line BD of the graph. Under the conditions now prevailing, continued increase in refrigerating load (or decrease in condensing capacity) effects progressive closure of the valve 54, accompanied by a reduction in weight rate of refrigerant flow, while the power input remains substantially constant. Also, under this mode of control, there is a reduction in evaporator pressure, but, at the same time, an increase in liquid pressure at the valve entrance.

This increase in liquid pressure is brought about by the progressive constriction of the aperture 58 by the conical valve portion 60 following the establishment of a relatively high condensing pressure in the chamber 42 as previously described. The pressure drop across the valve is now substantially greater than would be the case with the same valve opening under conditions of constant superheat regulation represented by the line ABC of the graph. Thus, it is by virtue of an increased pressure drop through the valve that the flow rate and, consequently, the evaporator pressure, are reduced sufficiently to prevent undesired rise in power input requirements. It will, of course, be appreciated that the superheat existing at the evaporator outlet under this condition is substantially in excess of that contemplated for constant superheat regulation. Notwithstanding this, however, the temperature of the evaporator will remain comparatively low, inasmuch as a major portion of this device will contain a saturated refrigerant vapor at low pressure.

Figure 3:
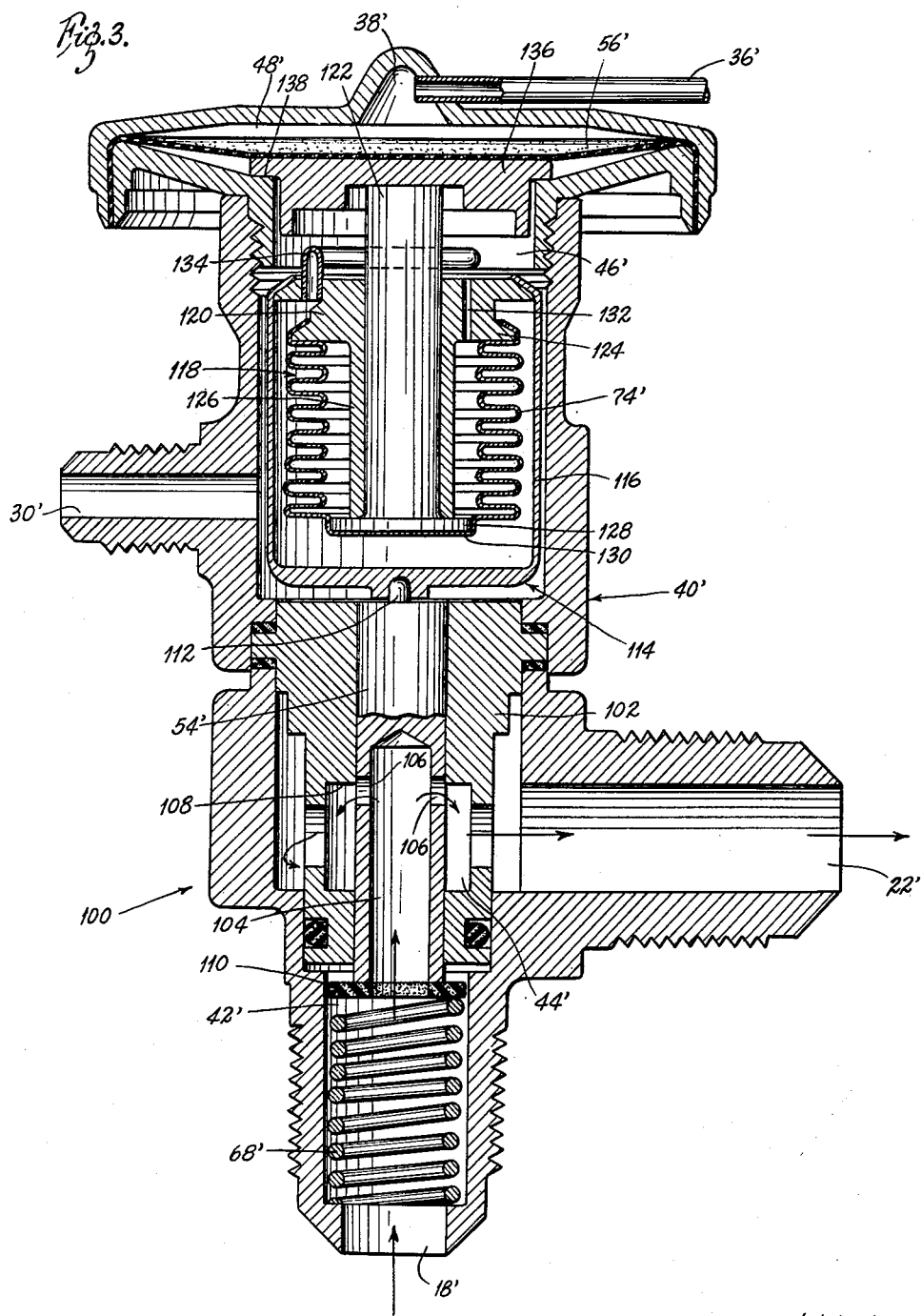
FIGURE 3 is a medial sectional view showing a preferred construction of the valve of the present invention.

The diagrammatically illustrated valve 20 shown in FIGURE 1 represents one embodiment of the valve of the present invention. A modified embodiment of the valve is illustrated in FIGURE 3, wherein it is designated generally by the numeral 100. A comparison between these figures of the drawing indicates that, while the valves 20 and 100 differ materially in configuration, they correspond generally in fundamental structure. To a reasonable extent, then, certain of the elements of the valve 100 having direct correspondence with elements in the valve 20 have been assigned the primed numerals of their counterparts. Thus, the valve 100 has an inlet port 18′, an outlet port 22′, and an equalizing port 30′. Further, a capillary tube 36′ communicates with an entrance area 38′ at the extreme upper end of a housing assembly shown generally as 40′. Liquid refrigerant under pressure is admitted through the port 18′ to an inner cavity or chamber 42′ from which it is valved into an outlet chamber 44′ prior to discharge from the outlet port 22′. Evaporator pressure admitted through the port 30′ to an equalizing chamber 46′ acts against the upper end of a valve member 54′ to urge the latter in an opening direction, and acts in opposition to bulb pressure developed within a bulb chamber 48′ to position a movable diaphragm 56′ for constant superheat regulation. A bellows 74′ charged with a non-condensable gas to predetermined pressure acts to influence control under compound pressure regulating conditions, and a compression spring 68′ contributes to the establishment of a preselected degree of superheat under constant superheat regulating conditions.

Directing attention more particularly to the differences between the valve 100 and the valve 20, the valve member 54′ of the former is of the hollow sleeve type slidably disposed in a fixed inner valve member 102 provided with a blind counterbore 104 which communicates by means of apertures 106 with the outlet chamber 44′. The latter takes the form of an annular cavity surrounding the sleeve valve 54 and communicating directly with the outlet port 22′ as illustrated. An edge portion 108 of the annular chamber 44′ cooperates with the apertures 106 to provide the desired valving action. The spring 68′ disposed within the inlet chamber 42′ acts against a washer 110 at the lower open end of the sleeve member 54′ to bias the same in a closing direction. The upper closed end of the valve member 54′ terminates in a protuberance 112 which engages the lower end of a variable spacing assembly shown generally as 114. The assembly 114 is movably disposed in the equalizer chamber 46′ and includes, in the illustrated embodiment, a hollow cup-like container 116 the immediate interior of which is closed and sealed by a bellows assembly 118. The assembly 118 in turn includes the bellows element 74′ and, in addition, a hollow closing plug 120, along with an elongated spacer 122. The upper rim of the cup-like member 116 is bent over the plug 120 and securely sealed thereto. The bellows member 74′ is also sealed at its upper end to an annular flange 124 on the member 120. The plug 120 has a central vertical bore including an extended sleeve-like portion 126 extending substantially the full length of the bellows 74′, and the spacer 122, which is generally cylindrical, is slidably disposed in the bore of the member 120. The lower end of the spacer 122 has a flat head portion 128 which fits flush with an inside bottom wall 130 of the bellows 74′. A passage 132 provided in the plug member 120 communicates the interior of the bellows 74′, with the equalizing chamber 46′. It is to be understood that the space externally of the bellows 74′ and internally of the cup-like container 116 is charged with a non-condensable gas, such as nitrogen, to a predetermined pressure. This charge will normally be introduced through a tube such as 134 which is then sealed in conventional manner.

The elongated spacer 122 extends upwardly beyond the plug 120 for abutting engagement on the underside of a stop plate 136 having a flat upper surface for abutment with the underneath side of the diaphragm 56′. An annular outer flange 138 of the stop member 136 is engageable with a fixed shoulder 133 provided in the housing assembly 40′ to limit the downward movement of the diaphragm 56′.

A specific difference between the valves 20 and 100 is that the former incorporates a separate superheat spring 84 in addition to the biasing spring 68. As previously noted, however, both of these springs combine to provide the conventional bias for maintaining a substantially constant predetermined degree of superheat for the constant superheat regulation of the valve 20. Changing the strength of either of the springs 68 or 84 by adjustment or replacement will be effective to change the degree of superheat maintained. Inasmuch however as the biasing spring 68 also influences the position of the valve member 54 during compound pressure regulation, it is evident that changes in the strength of this particular spring will also influence the evaporator pressure during compound pressure regulation, whereas the spring 84, being deactivated during such regulation, has its influence restricted to control of the degree of superheat during constant superheat regulation.

The spring 68' incorporated in the valve 100, like the spring 68 in the valve 20, is effective both to influence the degree of superheat during constant superheat regulation and to influence the evaporator pressure during compound pressure regulation.

Considering the spring 68' then to perform the functions of both of the springs 68 and 84 in the corresponding valve 20, the forces which tend to close the valve 100 include, in addition to the force of the spring 68' exerted against the lower end of the valve member 54', the liquid pressure acting against this same end of the valve and the evaporator pressure existing within the equalizing chamber 46' and acting upwardly against the bottom of the diaphragm 56'. The forces tending to open the valve 100, on the other hand, include the bulb pressure existing in the chamber 48' and tending to move the diaphragm 56' in a downward direction, the pressure of the non-condensable gas surrounding the bellows 74' and tending to maintain the spacing assembly 114 fully extended, and, finally, the evaporator pressure existing within the chamber 46' outside the assembly 114 and acting downwardly against the upper end of the valve member 54'.

The operation of the valve 100 is, of course, similar to that of the valve 20 previously described. In the range of constant superheat regulation, the non-condensable gas pressure between the cup member 116 and the bellows 74' causes the head 128 of the spacer 122 to be held firmly against the lower end of the sleeve 126 of the plug member 120. This provides maximum extension of the upper end of the spacer 122 above the lower portion of the cup member 116 which engages the valve member 54'. Hence, movements of the diaphragm 56' are transmitted without alteration of the valve 54'. At a critical point, such as B in the illustration of FIGURE 2, the stop plate 136 engages the housing shoulder 138 to prevent further downward movement of the diaphragm 56', and the increasing evaporator pressure in the equalizer chamber 46' is communicated through the passage 132 to the inside of the bellows 74'. The bellows is thus caused to expand and, since the diaphragm 56', the spacer 122, and the lower bellows wall 130 are maintained in fixed position by the high bulb pressure in the chamber 48', the cup member 116 is raised and the spring biased valve member 54' follows in a closing direction.

Clearly, there has been described and illustrated a thermostatic expansion valve in combination with a pressure limiting override which fulfills the objects and advantages sought therefor. The elements and the arrangement of elements in such a device may be varied in detail and still embody important features of the invention. It is intended, therefore, that such variations as may be reasonably encompassed within the scope of the following claims shall be subjected to the protection of this grant.

What is claimed is:

1. An expansion valve for a refrigerating system comprising, in combination, a housing defining an inlet chamber, an equalizer chamber, and a bulb chamber, partition means in the housing isolating each of said chambers from the others, said partition means including a movable wall between the equalizer chamber and the bulb chamber, an outlet chamber in the housing, valve means communicating said inlet chamber with said outlet chamber, said valve means including a movable valve element for regulating fluid flow through the valve from the inlet chamber to the outlet chamber, an equalizer port in the housing for communicating the equalizer chamber with an external source of pressure, remote bulb means containing a condensable fluid communicated with said bulb chamber for varying the pressure therein in predetermined correspondence with temperature changes of the bulb means, means interconnecting the movable wall between the equalizer chamber and the bulb chamber with the movable valve element for movement of the latter in correspondence with movement of the former, said interconnecting means being variable in length and including means sensitive to pressure in the equalizer chamber for rendering the valve element responsive to pressure changes in the equalizer chamber regardless of movement of the movable wall, spring means to oppose movement of the movable wall in a direction to increase fluid flow through the valve, the interconnecting means sensitive to pressure in the equalizer chamber including a movable wall element, and resilient compressible means biasing said movable wall element in opposition to the pressure exerted thereagainst and in a direction to effect opening movement of the valve element, the fluid pressure at the inlet chamber acting over a predetermined effective valve element area to bias the valve element toward a closed position, and fluid pressure in the equalizer chamber acting over another effective valve element area to bias the valve element toward an open position, and fluid pressure in the equalizer chamber acting over an effective area of the aforesaid movable wall element to oppose the valve element opening bias of the resilient compressible means, said effective area of the movable wall element being greater than the said other effective valve element area.

2. The combination of claim 1 wherein the movable wall between the bulb chamber and the equalizer chamber has an area substantially larger than the effective area of the valve element subject to fluid pressure at the inlet chamber.

3. The combination of claim 2 wherein the effective area of the movable wall element subject to fluid pressure in the equalizer chamber is larger than the effective area of the valve element subject to the same pressure, and wherein the difference therebetween is larger than the area of the valve element subject to fluid pressure at the inlet chamber.

4. An expansion valve for a refrigerating system comprising, in combination, a housing defining an inlet chamber, an equalizer chamber, and a bulb chamber, partition means in the housing isolating each of said chambers from the other, said partition means including a movable wall between the equalizer chamber and the bulb chamber, an outlet chamber in the housing, valve means communicating said inlet chamber with said outlet chamber, said valve means including a movable valve element for regulating fluid flow through the valve from the inlet chamber to the outlet chamber, an equalizer port in the housing for communicating the equalizer chamber with an external source of pressure, remote bulb means containing a condensable fluid communicated with said bulb chamber for varying the pressure therein predetermined correspondence with temperature changes of the bulb means, and means interconnecting the movable wall between the equalizer chamber and the bulb chamber with the movable valve element for movement of the latter in correspondence with movement of the former, said interconnecting means comprising a spacing assembly adapted to abut the movable wall at one end and the valve element at the other end, said assembly including mechanical force means biasing it toward a predetermined maximum length, said mechanical force means including a movable wall responsive to fluid pressure in a manner to shorten the length of the assembly, and means connected to the valve element and responsive to changes in pressure at the inlet chamber for throttling flow through the valve when inlet pressures increase.

5. The valve of claim 4 wherein the mechanical force means comprises sealed bellows means containing a charge of noncondensable gas.

6. The valve of claim 4 wherein the movable valve element is generally elongated and extends from the inlet chamber through the outlet chamber to the equalizer chamber, the portion subject to fluid pressure in the outlet chamber being formed to eliminate bias in either direction of movement of the valve.

7. An expansion device connected in series with an evaporator, a compressor, and a condenser, the device having an inlet port connected to the condenser outlet, and outlet port connected to the evaporator inlet, and a fluid passage between the inlet and the outlet ports, the device further comprising means for regulating the rate of refrigerant flow through the fluid passage means responsive to variations in superheat at the evaporator outlet for controlling the regulating means to maintain substantially constant superheat, and means responsive to pressure changes at either the inlet port or the outlet port and thereby operable upon an increase in compressor load above a predetermined value whether caused by changes in evaporator pressure or in condenser pressure for controlling the regulating means to provide such a rate of refrigerant flow through the expansion device as will result in substantially constant compressor power consumption.

8. The device of claim 7 wherein the compressor load responsive controlling means comprises a first element movable in response to changes in evaporator pressure and a second element movable in response to changes in condenser pressures, the position of the regulating means being responsive to movements of the first and second elements.

9. The device of claim 8 wherein there are means for rendering the compressor load responsive controlling means ineffective at compressor loads below the aforementioned predetermined value.

10. A refrigeration cycle comprising a compressor, a condenser, an expansion device, and an evaporator piped in series, means responsive to the superheat at the evaporator outlet for regulating the rate of refrigerant flow through the expansion device to maintain substantially constant superheat, and means operable upon a rise in compressor load above a predetermined maximum for reducing the rate of refrigerant flow through the expansion device the reducing means comprising apparatus movable in a flow throttling direction in response to an increase in evaporator outlet pressure and to an increase in condenser outlet pressure when the combination of evaporator outlet pressure and condenser outlet pressure is above a predetermined maximum.

11. The combination of claim 10 wherein the flow throttling apparatus comprises valve means in the path of refrigerant flow through the expansion device.

12. An expansion valve for a refrigerating system comprising, in combination, a housing defining an inlet chamber, an equalizer chamber, and a bulb chamber, partition means in the housing isolating each of said chambers from the others, said partition means including a movable wall between the equalizer chamber and the bulb chamber, an outlet chamber in the housing, valve means communicating said inlet chamber with said outlet chamber, said valve means including a movable valve element for regulating fluid flow through the valve from the inlet chamber to the outlet chamber, an equalizer port in the housing for communicating the equalizer chamber with an external source of pressure, remote bulb means containing a condensable fluid communicated with said bulb chamber for varying the pressure therein in predetermined correspondence with temperature changes of the bulb means, and means interconnecting the movable wall between the equalizer chamber and the bulb chamber with the movable valve element for movement of the latter in correspondence with movement of the former, said interconnecting means being variable in length and including means sensitive to pressure in the equalizer chamber for rendering the valve element responsive to pressure changes in the equalizer chamber regardless of movement of the movable wall, and means connected to the valve element and responsive to changes in pressure at the inlet chamber for throttling flow through the valve when inlet pressures increase.

References Cited in the file of this patent

UNITED STATES PATENTS

| | | |
|---|---|---|
| 2,201,728 | Hoesel | May 21, 1940 |
| 2,220,998 | Holmes | Nov. 12, 1940 |
| 2,264,545 | Newton | Dec. 2, 1941 |
| 2,505,933 | Aughey et al. | May 2, 1950 |
| 2,530,706 | Lange | Nov. 21, 1950 |
| 2,542,802 | Ehlke | Feb. 20, 1951 |
| 2,558,930 | Carter | July 3, 1951 |
| 2,571,625 | Selden | Oct. 16, 1951 |
| 2,577,903 | McGrath | Dec. 11, 1951 |
| 2,663,502 | Dillman | Dec. 22, 1953 |
| 2,701,451 | Candor | Feb. 8, 1955 |
| 2,701,688 | Dillman | Feb. 8, 1955 |
| 2,774,220 | Heym | Dec. 18, 1956 |